United States Patent [19]

Kimura et al.

[11] 3,967,287

[45] June 29, 1976

[54] LIGHT RECEIVING DEVICE FOR USE IN A SINGLE LENS REFLEX CAMERA

[75] Inventors: Kazuo Kimura, Sakai; Yasuo Yamazaki, Kawachinagano, both of Japan

[73] Assignee: Minolta Camera Kabushiki Kaisha, Japan

[22] Filed: Sept. 19, 1974

[21] Appl. No.: 507,522

[30] Foreign Application Priority Data

Sept. 20, 1973 Japan .............................. 48-109278

[52] U.S. Cl. .................................. 354/56; 354/225
[51] Int. Cl.$^2$ .......................................... G03B 17/20
[58] Field of Search ............................ 354/22–23, 354/54–56, 219–225

[56] References Cited

UNITED STATES PATENTS

| | | | |
|---|---|---|---|
| 3,603,200 | 9/1971 | Hiruma | 354/225 |
| 3,791,277 | 2/1974 | Kobori et al. | 354/51 |

FOREIGN PATENTS OR APPLICATIONS

| | | | |
|---|---|---|---|
| 1,622,190 | 4/1972 | Germany | 354/56 |
| 2,530,769 | 12/1966 | Japan | 354/54 |

*Primary Examiner*—L. T. Hix
*Assistant Examiner*—James LaBarre
*Attorney, Agent, or Firm*—Watson, Cole, Grindle & Watson

[57] ABSTRACT

A light measuring device for use in a single lens reflex camera includes: a transparent block located in the rear and upward location of a pentagonal prism and having at least one surface serving as a reflecting surface; and a light receiving portion including a photoelectric element having a light receiving surface, which portion is located in the vicinity of such one surface of the prism, such that part of the scene light which as been transmitted through an objective lens and scattered through the front portion of a focussing plate located in the optical path of a viewfinder is introduced into the transparent block, then reflected on such reflecting surface and introduced to the light receiving surface of the photoelectric element, while part of the scene light scattering through the rear portion of the focussing plate is transmitted through the transparent block and is then introduced into the light receiving surface, whereby the light beams from the entire surface of the scene may be measured at a desired distribution by the single light receiving portion located adjacent the pentagonal prism.

21 Claims, 12 Drawing Figures

FIG. 5
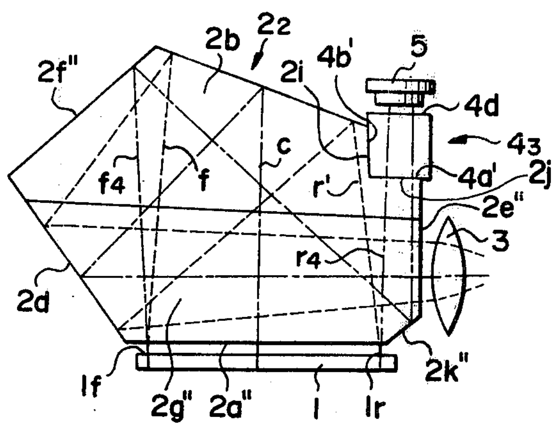
FIG. 7
(A)
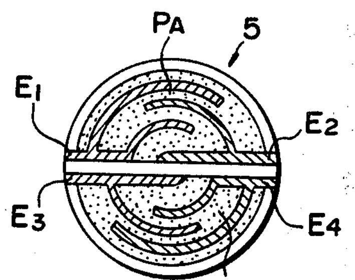
FIG. 7
(B)
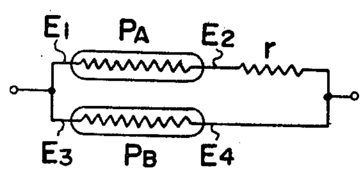
FIG. 7
(C)
$E_1$ $P_A$ $E_2$ $E_3$ $P_B$ $E_4$ (A)

(B)

(C)

LIGHT RECEIVING DEVICE FOR USE IN A SINGLE LENS REFLEX CAMERA

BACKGROUND OF THE INVENTION

This invention relates to a light measuring device for use in a single reflex camera, and more particularly to a light measuring device located in contact with the pentagonal prism in the single reflex camera and receiving part of the scene light which has been transmitted through an objective lens, thereby measuring the brightness of the scene light.

Two types of light receiving devices for measuring scene light which has been transmitted through an objective lens are known, i.e., a light receiving device of the type in which part of the light which is directed to an ocular is introduced to a light receiving element by an optical member such as a half-mirror and the device of the type in which such part of the scene light scattered on the focussing plate but not introduced to the objective lens is introduced to the light receiving device.

In addition, it is a known practice to locate the light receiving devices of the aforesaid two types adjacent a pentagonal prism, respectively, to introduce scene light to the light receiving device.

In this respect, it is required that the scene light from the entire scene to be photographed be uniformly introduced to the light receiving device of this type. Thus, if the light from the respective portions of a scene is introduced to the light receiving device non-uniformly, the photoelectric element in the light receiving device fails to produce the proper light measuring outputs corresponding to the brightness of the entire scene. In general, the image of a sky portion of the scene focussed in the front portion of a focussing plate is brighter than the ground image in the rear portion of the focussing plate. Thus, it is preferable that the scene light focussed in rear portion of the focussing plate be introduced in greater quantity into the light receiving device than that of the scene light focussing in the front portion of the focussing plate.

In contrast thereto, it would be advantageous if, as in the former instance, wherein part of the light beams in the optical path of a viewfinder are introduced to the light receiving device placed adjacent the pentagonal prism, uniform scene light throughout the entire scene may be introduced to the light receiving device. However, this poses disadvantages in that the image in a viewfinder to be observed is partly or entirely in the sense of image area darkened. Thus, if the brightness of an image is desired to be increased, then there results a decrease in the quantity of the light to be introduced to the light measuring device, with the accompanying decrease in a light measuring output, thus lowering the accuracy of light measurement.

Turning to the latter light receiving device, this device is to measure the scene light which is not incident on an ocular lens. Thus, this can introduce a great quantity of scene light to the light receiving device without darkening the viewfinder image. However, receiving the light other than that adapted for the view finder, the device is more responsive to the light from the part of image closer to the device than to that distant from the device, and consequently, the device can not measure scene light with a desired sensitivity distribution. For this reason, with the light receiving device of this type for use in measuring light beams, there should be provided two light receiving devices in symmetric fashion with respect to the optical axis of the optical path of a viewfinder or the center of an image, but adjacent the pentagonal prism located out of the optical path of a viewfinder, while respective photoelectric elements of both the light receiving devices should be connected in series or parallel to each other to thereby obtain a light measuring output resulting from uniform measurement of light beams from the entire scene. Meanwhile, it is desired to render the size of a camera compact, for obtaining good portability. In this sense, it is not advantageous to use two light receiving devices. The pentagonal prism as used in a single reflex camera is large in its volume and weight. This leads to the increase in the volume and weight of the viewfinder and brings the position of gravity of the camera high in the normal attitude thereof. This is not desirable from the viewpoints of stability of a camera.

OBJECTS OF THE INVENTION

It is an object of the present invention to provide a light receiving device which is compact in size and light in weight and which may measure scene light of the entire scene to be photographed, while being located adjacent a pentagonal prism.

It is another object of the present invention to provide a light receiving device which may receive at a desired distribution the scene light from the respective portions of the scene, by means of a single light receiving device located adjacent a pentagonal prism outside the optical path of a viewfinder.

It is a further object of the present invention to provide a light receiving device which may uniformly measure the scene light of the entire scene, by means of the provision of a single light measuring device adjacent a pentagonal prism, the light receiving device having a photoelectric element which is adapted to receive part of the scene light which has been transmitted through an objective lens located out of the optical path of a viewfinder.

These and other objects and features of the present invention will become more apparent from the following detailed description of the invention when taken in conjunction with the accompanying drawings which indicate the preferred embodiments of the present invention.

BRIEF DESCRIPTION OF THE DRAWINGS

FIG. 5 is a side elevational view of a light measuring device for measuring the scene light, which is given for comparison with the embodiment of the present invention;

FIG. 6(B) refers to the scene light scattered in the rear portion of the optical path of a viewfinder, and FIG. 6(C) refers to both the scene lights;

FIG. 7 shows one example of the photoelectric element in the light receiving device for use in measuring the scene light, according to the present invention, in which FIG. 7(A) is a front view of the light receiving surface of a photoelectric element, and FIGS. (B) and (C) refer to the wiring diagrams of the above photoelectric elements, respectively.

DETAILED DESCRIPTION OF THE INVENTION

Figure 1:
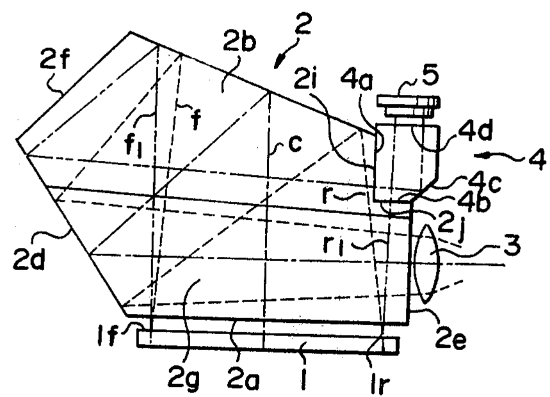
FIG. 1 is a side view of one embodiment of a light receiving device for use in measuring the scene light according to the present invention.
Figure 2:
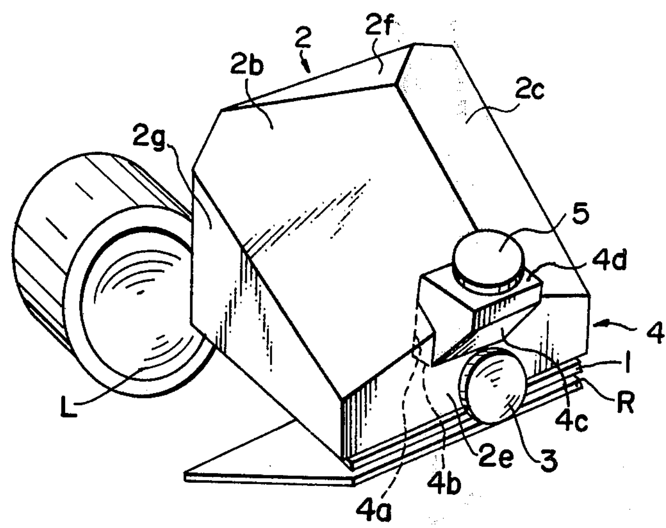
FIG. 2 is a perspective view of the embodiment of FIG. 1.

FIGS. 1 and 2 show the first embodiment of the present invention. The scene light which has been transmitted through an objective lens L and reflected by a movable reflex mirror R in a single reflex camera (not shown) is focussed on a focussing plate 1 to give an image of a scene to be photographed, and is then scattered through the focussing plate 1.

In considering a completely focussed condition, when viewed sidewise As in FIG. 1, the front edge of an image is focussed on 1*f*, while the rear edge thereof is focussed on 1*r*. When a single reflex camera is in the normal attitude, the upper edge of a scene is focussed on 1*r*, while the lower edge of the scene is focussed on 1*r*.

The light beams which have been scattered through the aforesaid focussing plate 1 are introduced through a bottom surface 2*a* of a pentagonal prism 2 and then give two types of the light beams, i.e., the one which are reflected on its reflecting surface and introduced into an ocular lens 3, the aforesaid light beams being confined between the broken lines *f* and *r* in the optical path of a viewfinder, and the ones which have been scattered outside the optical path of a viewfinder.

The pentagonal prism has a rear upper roof surface 2*b*, 2*c* and a back surface 2*e* having cut-surfaces 2*i* and 2*j*, respectively, while a transparent block 4 is joined to the pentagonal prism, with its surface 4*a* in contact with surface 2*i* and with its surface 4*b* in contact with surface 2*j*.

The transparent block 4 has a reflecting surface 4*c* inclined relative to a surface 4*b* in such a manner as to face surface 4*a*, and the block has a surface 4*d* facing surface 4*b*, in addition to a light receiving portion 5 having a photoelectric element and located adjacent to surface 4*d* thereabove.

The light beams which are advancing through the front edge 1*f* of focussing plate 1 along the optical path of a viewfinder are reflected on roof surfaces 2*b* and 2*c* of pentagonal prism 2, as has been described earlier, and are then reflected on front surface 2*d* and incident on the upper edge of the ocular lens; while light beams *f*. 1 which have been scattered outside the optical path of a viewfinder but forwardly of light beams *f* are reflected on reflecting surfaces 2*b*, 2*c*, 2*d*, then advance over light beams *f* towards the back surface 2*e* and thus are not introduced into ocular lens 3. Some of the light beams *f*1 are reflected on roof surfaces 2*b*, 2*c* and front surface 2*d* of the pentagonal prism and then advance toward cut surface 2*i*, are then transmitted through surfaces 2*i* and 4*a*, introduced into the transparent block, and are then reflected on reflecting surface 4*c* thereof to advance toward surface 4*d* and incident on the photoelectric element of light receiving portion 5 located adjacent surface 4*d*.

On the other hand, light beams *r*1, which have been scattered rearwardly of light beams *r* which advance along the optical path of a viewfinder through rear edge 1*r* of a scene image formed at the rearmost edge 1*r* of focussing plate 1, are transmitted through cut-surface 2*d* of the pentagonal prism as well as through surface 4*b* of transparent block 4, then toward surface 4*d* through transparent block 4 and into the light receiving surface of the photoelectric element of light receiving portion 5.

Likewise, part of the light beams which have been scattered forwardly but outside the optical path of a viewfinder through front edge 1*f* and rear edge 1*r* of focussing plate 1, on which is formed an image, advance as the first luminous flux along the path similar to that of light beams *f*1, then through joint surface 4*a* into transparent block 4, being reflected on reflecting surface 4*c*, and then into light receiving portion 5, while part of the light beams which have been scattered rearwardly but outside the optical path of a viewfinder advance as the second luminous flux along the path similar to that of light beams *r*1 through joint surface 4*b* into transparent block 4 and then into light receiving portion 5.

The ratio in intensity, of the first and second luminous fluxes may be selected with ease based on inclinations and areas of the transparent surfaces of joint surfaces 2*i* and 4*a* of the pentagonal prism, inclinations and areas of the transparent surfaces of joint surfaces 2*j* and 4*b*, areas of reflecting surface 4*c* and the like.

Figure 6:
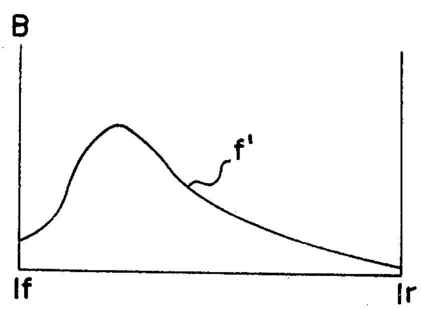
FIG. 6 is a plurality of graphs showing the brightness characteristics of scene light received in the light receiving surface of a photoelectric element with respect to the vertical direction of a scene, in the embodiment according to the present invention, in which FIG. 6(A) refers to the scene light scattered in the front portion of the optical path of a viewfinder.
Figure 6:
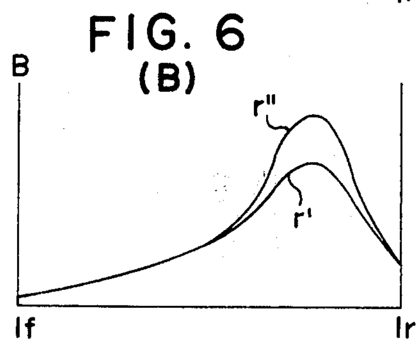
Figure 6:
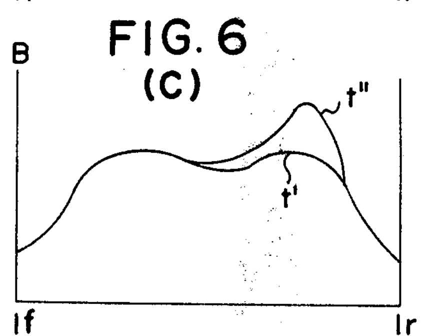

FIG. 6(A) illustrates a curve *f*′ of the luminance of the light receiving surface of a light receiving element which receives such light beams of the first luminous flux which have been scattered forwardly of the optical path of the viewfinder through a range covering from front edge 1*f* to rear edge 1*r* of focussing plate 1 along the center line thereof, assuming a photographic object having a uniform brightness. FIG. 6(B) illustrates a curve *r*′ of the luminance of the light receiving surface of a light receiving element which receives such light beams of the second luminous flux which have been scattered rearwardly of the optical path of a viewfinder. Thus, the luminance of the light receiving surface of light receiving element 5 which receives the aforesaid both light beams is illustrated as a curve *t*′ in FIG. 6(C), proving that the light beams are uniformly received from the respective portion of a photographic object throughout the range covering between front edge 1*f* and rear edge 1*r*. This means that the photoelectric element of light receiving portion 5 measures the brightness of an image on focussing plate 1, uniformly.

Figure 3:
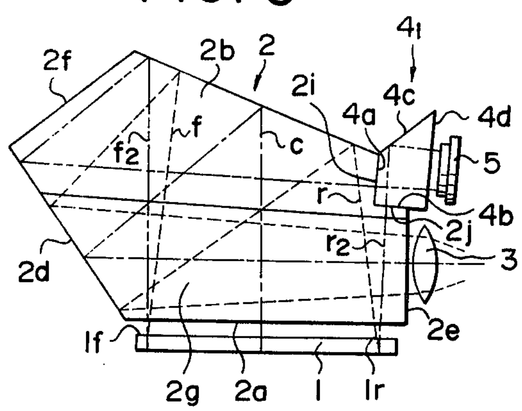
FIG. 3 is a side view of another embodiment of the light receiving device for use in measuring the scene light according to the present invention.

FIG. 3 shows the second embodiment of the present invention. This embodiment includes the same fundamental construction as that of the first embodiment in that there are provided at least two joint surfaces 4*a* and 4*b* adjacent pentagonal prism 2, and there are provided reflecting surfaces 4*c* and 4*d* adjacent light receiving portion 5. This embodiment differs in that the shape of a transparent block is varied to that shown at $4_1$ in FIG. 3.

With this embodiment, light beams *f*2 of the first luminous flux which have been scattered forwardly of optical paths *f*, *r*, of a viewfinder through focussing plate 1 are reflected on roof surfaces 2*b*, 2*c* of the pentagonal prism, then reflected again on the forward reflecting surface $2d$ and advance through surfaces $2i$, $4a$ into transparent block $4_1$, then through surface $4d$ facing joint surface $4a$ and into the light receiving element of light receiving portion 5. On the other hand, the light beams $r2$ of the second luminous flux which have been scattered rearwardly of optical paths $f$, $r$ of a viewfinder through focussing plate 1, advance through bottom surface $2a$ of pentagonal prism 2, then through joint surfaces $2j$, $4b$, and are reflected on reflecting surface $4c$ of transparent block $4_1$, then advance through surface $4d$ of transparent block $4_1$ and into the light receiving surface of the photoelectric element of light receiving portion 5.

Figure 4:
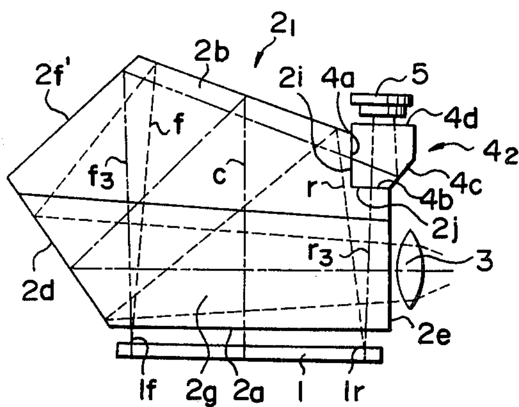
FIG. 4 is a side elevational view of still another embodiment.

FIG. 4 shows the third embodiment of the light receiving device according to the present invention. A transparent block $4_2$ assumes a shape approximately that of transparent block 4 but differs from the first embodiment in pentagonal prism $2_1$ in that a surface $2f$ which does not serve as a reflecting surface for the optical path of a viewfinder is polished to give a reflecting surface $2f'$. The light beams $f3$ of the first luminous flux which have been scattered forwardly of optical paths $f$, $r$ of a viewfinder through focussing plate 1 are reflected on reflecting surface $2f'$ and advance toward joint surface $2i$, through joint surfaces $2i$, $4a$ into transparent block $4_2$, and are reflected on reflecting surface $4c$ through surface $4d$ into the photoelectric element of light receiving portion 5 located thereabove. On the other hand, the light beams $r3$ of the second luminous flux which have been scattered rearwardly of optical paths $f$, $r$ of a viewfinder through focussing plate 1 are transmitted through joint surfaces $2j$, $4b$, in the same manner as that of the first embodiment, then through joint surfaces $2j$, $4b$ and transparent block $4_2$, then through surface $4d$ and into the photoelectric element of light receiving portion 5.

FIG. 5 shows an example, for comparison purpose, which incorporates the same principle but differs from the embodiment of the present invention discussed above in the following manner. In other words, according to the previous embodiment of the present invention, either one of the light beams which have been scattered forwardly or rearwardly of optical paths $f$, $r$ of a viewfinder in transparent block 4 are reflected on reflecting surface $4c$ of transparent block 4. In contrast thereto, with the above comparative example, reflecting surface $4c$ is omitted and both the aforesaid light beams are transmitted through joint surface $4a'$ into the transparent block, then through the transparent block and into the photoelectric element of light receiving portion 5. In this case, there should be provided a reflecting surface $2f''$ for a pentagonal prism $2_2$, as in the third embodiment, and another reflecting surface $2k''$ which faces the reflecting surface $2f''$ should also be provided. Thus, light beams $f4$ of the first luminous flux which have been scattered forwardly but outside of the optical path of a viewfinder should be directed toward joint surface $4a'$, being reflected on the reflecting surface $2f''$ and $2k''$, twice. Although the provision of an additional two reflecting surfaces for the pentagonal prism to the reflecting surface for the optical path of a viewfinder leads to difficulties in the manufacture of pentagonal prism $2_2$, and thus to the practicality of its manufacture, the fact that the present invention uses a single reflecting surface for the transparent block is of utmost importance.

In general, when a single reflex camera is used for photographing in the normal attitude, as has been described earlier, the sky portion in the upper part of a scene is focussed in the front portion of focussing plate 1 and looks brighter, while the ground portion in the lower part of a scene is focussed in the rear portion of the plate 1 and looks darker. When curve $r'$ is changed to $r''$ in FIG. 6(B), curve $t'$ in FIG. 6(C) will be a curve $t''$. Thus, it is possible to provide such a design that the light beams through the rear part of focussing plate 1 be introduced in greater quantity into the photoelectric element of light receiving portion 5 than through the front portion of plate 1.

Figure 8:
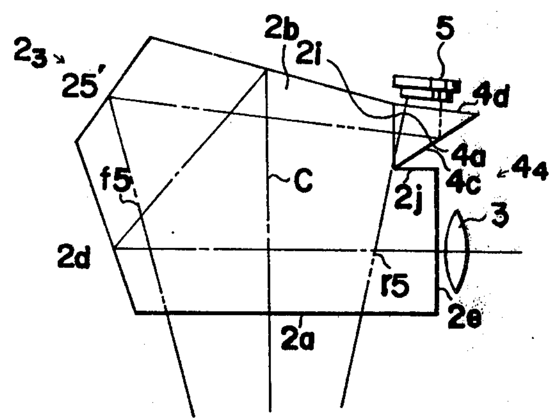
FIG. 8 is a side elevational view of a further embodiment of the present invention.

FIG. 8 shows a fourth embodiment of the present invention, in which a transparent block $4_4$ is joined with a pentagonal prism $2_3$ only on a single joint surface $2i$, $4b$. Light beams $f5$ of the first luminous flux of the image light beams on the focussing plate, which light beams have been transmitted through single joint surface $2i$, $4a$ and scattered through the front portion of the prism and light beams $r5$ of the second luminous flux, which light beams have been scattered through the rear portion of the prism are both incident on transparent block $4_4$, whereby the former is reflected on the reflecting surface $4c$ of the transparent block $4_4$ and is introduced into light receiving portion 5, while the latter is directly transmitted through the surface $4d$ into light receiving portion 5.

In this embodiment, since the angles of incidence of both or either of the light beams $f5$, $r5$ of the first luminous flux and second luminous flux will be greater with respect to joint surface $2i$, $4b$, it is desired that the refractive powers of pentagonal prism $2_3$ and transparent block $4_4$ be the same for preventing the surface reflection on joint surface $2i$, $4b$.

With the aforesaid embodiments, it is possible to provide a single photoelectric element within light receiving portion 5. Alternatively, as shown in FIG. 7(A), there may be provided two mutually insulated and split photoelectric elements PA and PB within light receiving portion 5, andthen both the respective terminals E1, E2 and E3, E4 of both photoelectric elements PA and PB may be connected in parallel to each other, coupled with a fixed resistor as shown in FIG. 7(B), or may be connected in series, as shown in FIG. 7(C), thereby improving the sensitivity.

Obviously, many modifications and variations of the invention are made possible in the light of the above teachings. It is therefore to be understood that within the scope of the appended claims the invention may be practiced otherwise than as specifically described.

What is claimed is:

1. A light receiving apparatus for use in a system for measuring light beams which have passed through an objective lens of a single lens reflex camera, the apparatus comprising:

a focussing plate disposed in a path of the light beams passing through the objective lens and for scattering such light beams as they pass therethrough, said focussing plate having a forward portion and a rear portion with respect to the objective lens;

an ocular lens through which an image on said focussing plate can be viewed;

a pentagonal prism for transmitting a substantial portion of the scattered light beams to said ocular lens, said pentagonal prism having a bottom surface located above said focussing plate, a pair of roof reflecting surfaces, a lower front reflecting surface, and a rear emission surface located adjacent to said ocular lens, so that said substantial portion of said scattered light beams is introduced through said bottom surface, reflected on said pair of roof reflecting surfaces, reflected on said lower front reflecting surface, and emitted from said rear emission surface towards said ocular lens;

light reflecting means located at a front and upward portion of said pentagonal prism, such portion being adjacent to both said pair of roof reflecting surfaces and said lower front reflecting surfaces;

light emitting means located at a rear and upward portion of said pentagonal prism, such portion being adjacent to both said pair of roof reflecting surfaces of said rear emission surface, said light emitting means receiving light beams of a first luminous flux scattered mainly from said forward portion of said focussing plate and light beams of a second luminous flux scattered mainly from said rear portion of said focussing plate, such that said first luminous flux is introduced through said bottom surface of said pentagonal prism, reflected by said light reflecting means and received by said light emitting means, whereas said second luminous flux is introduced through said bottom surface of said pentagonal prism and directly received by said light emitting means;

a transparent block mounted on said light emitting means, said transparent block having a joint surface with said light emitting means, such that both said first and second luminous fluxes pass through said joint surface, a reflecting surface for reflecting one of said first and second luminous fluxes and an emission surface for emitting both of said first and second luminous fluxes after one has been reflected on said reflecting surface of said transparent block and after the other has passed directly through said transparent block; and, light responsive means located adjacent to said emission surface of said transparent block for receiving said first and second luminous fluxes.

2. A light receiving apparatus as defined in claim 1, wherein said first luminous flux is that flux being reflected by said reflecting surface of said transparent block.

3. A light receiving apparatus as defined in claim 2, wherein said light emitting means is a cut-away surface formed at said rear and upward portion of said pentagonal prism.

4. A light receiving apparatus as defined in claim 3, wherein said light reflecting means is a polished reflecting surface formed at said front and upward portion of said pentagonal prism.

5. A light receivng apparatus as defined in claim 2, wherein said light emitting means and said reflecting surface of said transparent block are arranged for directing said second luminous flux to said light responsive means at the same ratio as said first luminous flux.

6. A light receiving apparatus as defined in claim 2, wherein said light emitting means and said reflecting surface of said transparent block are arranged for directing said second luminous flux to said light responsive means at a greater ratio than said first luminous flux.

7. A light receiving apparatus as defined in claim 6, wherein said light responsive means includes two mutually insulated photoelectric elements arranged so that each receives one of said first and second luminous fluxes.

8. A light receiving apparatus for use in a system for measuring light beams which have passed through an objective lens of a single lens reflex camera, the apparatus comprising:

a focussing plate disposed in a path of the light beams passing through the objective lens and for scattering such light beams as they pass therethrough, said focussing plate having a forward portion and a rear portion with respect to the objective lens;

an ocular lens through which an image on said focussing plate can be viewed;

a pentagonal prism for transmitting a substantial portion of the scattered light beams of said ocular lens, said pentagonal prism having a bottom surface located above said focussing plate, a pair of roof reflecting surfaces, a lower front reflecting surface, and a rear emission surface located adjacent to said ocular lens, so that said substantial portion of said scattered light is introduced through said bottom surface, reflected on said pair of roof reflecting surfaces, reflected on said lower front reflecting surface, and emitted from said rear emission surface towards said ocular lens;

first light reflecting means located at a front and upward portion of said pentagonal prism, such portion being adjacent to both said pair of roof reflecting surfaces and said lower front reflecting surface;

second light reflecting means located at a rear and lower portion of said pentagonal prism, such portion being adjacent to both said rear emission surface and said bottom surface;

light emitting means located at a rear and upward portion of said pentagonal prism, such portion being adjacent to both said pair of roof reflecting surfaces and said rear emission surface, for receiving light beams of a first luminous flux scattered mainly from said forward portion of said focussing plate and light beams of a second luminous flux scattered mainly from said rear portion of said focussing plate, so that said first luminous flux is introduced through said bottom surface of said pentagonal prism, reflected on said first light reflecting means, reflected on said second light reflecting means and received by said light emitting means and said second luminous flux is introduced through said bottom surface of said pentagonal prism and is directly received by said light emitting means;

a transparent block mounted on said light emitting means, said transparent block having a joint surface with said light emitting means and an emission surface for emitting said first and second luminous fluxes introduced through said joint surfaces; and, light responsive means located adjacent to said emission surface of said transparent block, for receiving said first and second luminous fluxes.

9. A light receiving apparatus as defined in claim 8, wherein said light emitting means is a cut-away surface formed at said rear end upward portion of said pentagonal prism.

10. A light receiving apparatus as defined in claim 9, wherein said first light reflecting means is a polished reflecting surface formed at said front and upward portion of said pentagonal prism.

11. A light receiving apparatus as defined in claim 10, wherein said second light reflecting means is a cut-away reflective surface formed at said rear and downward portion of said pentagonal prism.

12. A single lens reflex camera including an objective lens, a focussing plate for scattering light beams which has passed through said objective lens, an ocular lens through which an image on said focussing plate can be viewed, a pentagonal prism for transmitting the light beams scattered from said focussing plate to said ocular lens, and a light receiving device; wherein said light receiving device comprises:

light reflecting means located at a front and upward portion of said pentagonal prism;

light emitting means located at a rear and upward portion of said pentagonal prism for receiving light beams of a first luminous flux scattered mainly from a forward portion of said focussing plate and light beams of a second luminous flux scattered mainly from a rear portion of said focussing plate, said first luminous flux being introduced into said pentagonal prism, reflected on said light scattering means and received by said light emitting means, and said second luminous flux being introduced into said pentagonal prism and transmitted through said prism so as to be directly received by said light emitting means;

a transparent block mounted on said light emitting means, said transparent block having a joint surface with said light emitting means, such that both said first and second luminous fluxes pass through said joint surface, a light reflecting surface for reflecting said first luminous flux, and an emission surface for emitting said first luminous flux after being reflected on said reflecting surface and said second luminous flux; and, light responsive means located adjacent to said emission surface of said transparent block for receiving said first and second luminous fluxes.

13. A camera as defined in claim 12, wherein said light emitting means is a cut-away surface formed at said rear and upward portion of said pentagonal prism.

14. A camera as defined in claim 12, wherein said light emitting means and said light reflecting surface of said transparent block are arranged for directing said second luminous flux to said light responsive means at the same ratio as said first luminous flux.

15. A camera as defined in claim 12, wherein said light emitting means and said light reflecting surface of said transparent block are arranged for directing said second luminous flux to said light responsive means at a greater ratio than said first luminous flux.

16. A camera as defined in claim 15, wherein said light responsive means includes two mutually insulated photoelectric elements arranged so that each receives one of said first and second luminous fluxes.

17. A light receiving apparatus for use in a system for measuring light beams which have passed through an objective lens of a single lens reflux camera, the apparatus comprising:

a focussing plate disposed in the path of the light beams passing through the objective lens and for scattering such light beams as they pass therethrough, said focussing plate having a forward portion and a rear portion with respect to the objective lens;

an ocular lens through which an image on said focussing plate can be viewed;

a pentagonal prism for transmitting a substantial portion of the scattered light beams to said ocular lens, said pentagonal prism having a bottom surface located above said focussing plate, a pair of roof reflecting surfaces, a front reflecting surface and a rear emission surface located adjacent to said ocular lens, so that said substantial portion of said scattered light beams is introduced through said bottom surface, reflected on said pair of roof reflecting surfaces, reflected on said front reflecting surface and emitted from said rear emission surface towards said ocular lens;

light emitting means located at a rear and upward portion of said pentagonal prism, such portion being adjacent to both said pair of roof reflecting surfaces and said rear emission surface, said light emitting means receiving light beams of a first luminous flux scattered mainly from said forward portion of said focussing plate, such that said first luminous flux is introduced through said bottom surface of said pentagonal prism, reflected on said pair of roof reflecting surfaces, reflected on said front reflecting surface and received by said light emitting means, and said second luminous flux is introduced through said bottom surface of said pentagonal prism and directly received by said light emitting means;

a transparent block mounted on said light emitting means, said transparent block having a joint surface with said light emitting means, such that both said first and second luminous fluxes pass through said joint surface, a reflecting surface for reflecting said second luminous flux and an emission surface for emitting both of said first and second luminous fluxes after said second luminous flux has been reflected on said reflecting surface of said transparent block and said first luminous flux has passed directly through said transparent block; and, light responsive means located adjacent to said emission surface of said transparent block for receiving said first and second luminous fluxes.

18. A light receiving apparatus as defined in claim 17, wherein said light emitting means is a cut-away surface formed at said rear and upward portion of said pentagonal prism.

19. A light receiving apparatus as defined in claim 17, wherein said light emitting means and said reflecting surface of said transparent block are arranged for directing said second luminous flux to said light responsive means at the same ratio as said first luminous flux.

20. A light receiving apparatus as defined in claim 17, wherein said light emitting means and said reflecting surface of said transparent block are arranged for directing said second luminous flux to said light responsive means at a greater ratio than said first luminous flux.

21. A light receiving apparatus as defined in claim 17, wherein said light responsive means includes two mutually insulated photoelectric elements arranged so that each receives one of said first and second luminous fluxes.

* * * * *